(12) United States Patent  
Anderman

(10) Patent No.: US 7,392,964 B1  
(45) Date of Patent: Jul. 1, 2008

(54) METHOD AND APPARATUS FOR UTILIZING A LIFEBOAT FOR A SPACE STATION IN EARTH ORBIT TO SERVE AS A LUNAR SPACECRAFT

(76) Inventor: David Anderman, 2313-B Via Puerta, Laguna Hills, CA (US) 92637

( * ) Notice: Subject to any disclaimer, the term of this patent is extended or adjusted under 35 U.S.C. 154(b) by 15 days.

(21) Appl. No.: 11/160,200

(22) Filed: Jun. 13, 2005

Related U.S. Application Data

(60) Provisional application No. 60/579,003, filed on Jun. 11, 2004.

(51) Int. Cl.  
*B64G 1/12* (2006.01)  
*B64G 1/62* (2006.01)  
*B64G 1/64* (2006.01)

(52) U.S. Cl. .............. 244/158.2; 244/159.1; 244/172.4

(58) Field of Classification Search .............. 244/158.2, 244/158.3, 172.4, 159.3, 159.1  
See application file for complete search history.

(56) References Cited

U.S. PATENT DOCUMENTS

| | | | | | |
|---|---|---|---|---|---|
| 3,144,219 | A | * | 8/1964 | Schnitzer | 244/158.3 |
| 3,262,654 | A | * | 7/1966 | Kaempen | 244/172.4 |
| 3,333,788 | A | * | 8/1967 | Dryden | 244/158.2 |
| 3,700,193 | A | * | 10/1972 | Bradley | 244/159.3 |
| 6,669,148 | B2 | * | 12/2003 | Anderman et al. | 244/172.4 |

* cited by examiner

*Primary Examiner*—Rob Swiatek

(57) ABSTRACT

Methods and an apparatus for a lifeboat of a space station in orbit to be docked with and used in combination with a separately launched logistics module having an upper stage propulsion capability as a space craft for human pilots and passengers to be flown to orbits and trajectories in deep space beyond low Earth orbit including the Moon, at the lowest practical cost.

5 Claims, 2 Drawing Sheets

A) Docking port

B) Visual target for docking (2)

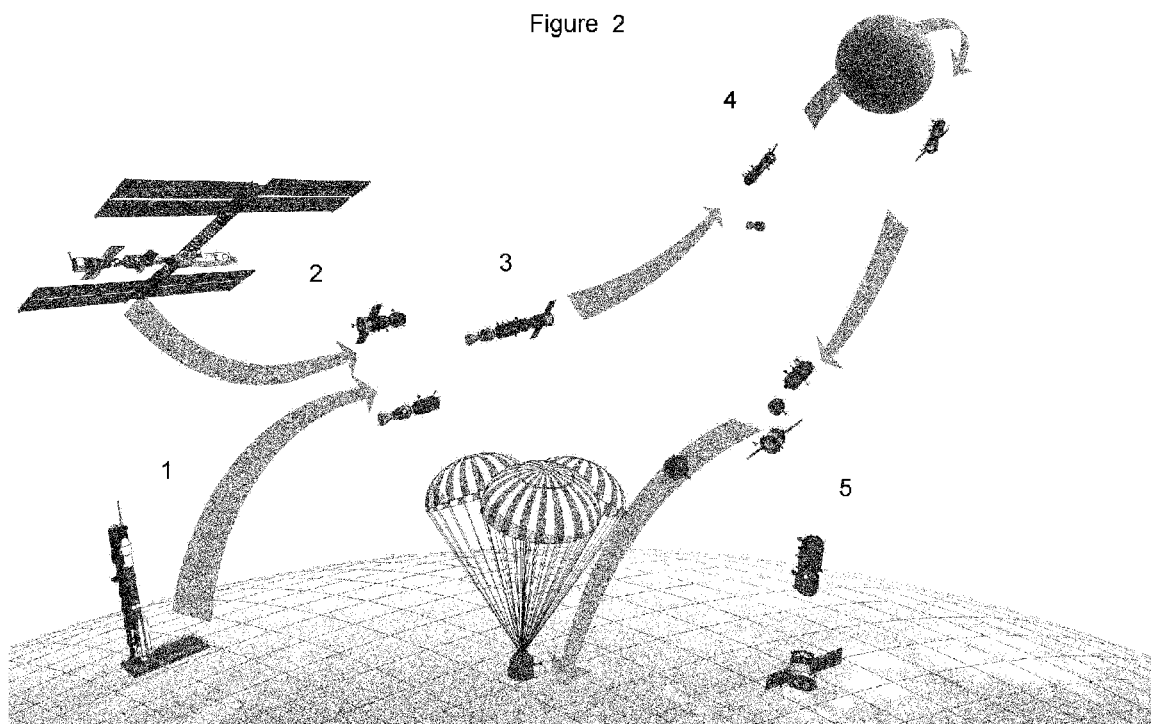

METHOD AND APPARATUS FOR UTILIZING A LIFEBOAT FOR A SPACE STATION IN EARTH ORBIT TO SERVE AS A LUNAR SPACECRAFT

CROSS REFERENCE TO RELATED APPLICATIONS

This patent application claims the benefit of the filing of U.S. Provisional Patent Application Ser. No. 60/579,003 filed on Jun. 11, 2004.

NO GOVERNMENT RIGHTS

The present invention was not developed using government funds and is not subject to the reservation of any government rights in the invention.

COPYRIGHT

A portion of the disclosure of this patent application contains material that is subject to copyright protection. The owner has no objection to the facsimile reproduction by anyone of the patent document of the patent disclosure, at it appears in the Patent and Trademark Office patent file or records, but otherwise reserves all copyright whatsoever.

FIELD OF THE INVENTION

The present invention relates to methods and an apparatus for a lifeboat for a space station in orbit to be used as a spacecraft for human pilots and passengers to be flown to the Moon, at the lowest practical cost.

BACKGROUND OF THE INVENTION

Missions to the lunar vicinity are costly, partially because all vehicles for past lunar missions have been constructed for the missions, and launched on very large launch vehicles that are required to orbit both the spacecraft and the upper stage necessary to provide the additional velocity for the spacecraft to leave Earth orbit and travel to the Lunar vicinity. Since no current launch vehicle is large enough to orbit both a human piloted spacecraft and an upper stage sufficiently capable to put the spacecraft on a translunar trajectory, the resulting costs for a lunar mission has been too high to warrant sending crews to the Moon since 1972. The present invention is intended to reduce costs of lunar missions so that these missions would cost little or more than current missions in Earth orbit.

Another problem is that spacecraft intended for human pilots and passengers are very expensive, and any lunar mission that effectively consumes such a spacecraft during a normal mission has a high cost.

Another problem is that spacecraft designed for operation in Earth orbit do not normally contain all systems required for lunar missions, and modification of a spacecraft intended for flight in Earth orbit for lunar operations would be costly and moreover these additional lunar systems may reduce the spacecraft's operations for Earth orbit missions.

Another problem is that Earth-orbit rendezvous architectures for lunar missions, which require the Lunar Crew Return spacecraft (CRS) to rendezvous and dock with the remaining part of the lunar spacecraft in Earth orbit, before heading to the lunar vicinity, require that both launches occur in a relatively short period of time. The requirement for dual launches in a short period significantly increases mission risk as it is normal for launches to be delayed, particularly from spaceports such as Kennedy Space Center which experience a good deal of poor weather. For example, if the second launch is delayed, by weather or last minute issues with the launch vehicle or spacecraft, while the first spacecraft is in orbit, this may create a Hobson's choice of either returning the first spacecraft to Earth from Earth orbit (thereby wasting the first launch and delaying the entire mission to the Moon), or rushing the second launch, possibly by waiving requirements (as NASA has done in the past under schedule pressure) and thereby increasing the risk of a failed launch.

SUMMARY OF THE INVENTION

In orbital operations, a space platform designed for occupation by human crews is normally equipped with a lifeboat intended to perform return to earth of the crews, either in an emergency, or in normal operations of the space platform. In all cases to date, the lifeboat has ended its service life with a direct return to Earth from orbit.

If a requirement for flight to the lunar vicinity is required, this lifeboat could be used to send a crew from the space platform instead of a direct return to Earth, using the present invention. In this case, prior to departure from the space platform by the crew, a docking module would be launched to a parking orbit by an expendable launch vehicle, and await the approach of the space station lifeboat. The attitude control of this docking module would be maintained by the upper stage of this expendable launch vehicle, which also would maintain a supply of propellant and have the capability of engine restart and a large supply of propellant. Once the lifeboat docks with the lifeboat, the upper stage would ignite its engines and provide trans-lunar injection for the entire complex.

Another problem is that Earth-orbit rendezvous architectures for lunar missions, which require the Lunar Crew Return spacecraft to rendezvous and dock with the remaining part of the lunar spacecraft in Earth orbit, before heading to the lunar vicinity, require that both launches occur in a relatively short period of time. The requirement for dual launches in a short period significantly increases mission risk as it is normal for launches to be delayed, particularly from spaceports such as Kennedy Space Center which experience a good deal of poor weather. For example, if the second launch is delayed, by weather or last minute issues with the launch vehicle or spacecraft, while the first spacecraft is in orbit, this may create a Hobson's choice of either returning the first spacecraft to Earth from Earth orbit (thereby wasting the first launch and delaying the entire mission to the Moon), or rushing the second launch, possibly by waiving requirements (as NASA has done in the past under schedule pressure) and thereby increasing the risk of a failed launch.

Another implementation of this method would be: a Docking/Logistics Module (DLM) would be separately delivered to a space platform in orbit (instead of being launched with the upper-stage as in the nominal mission), most likely the same space platform as the lifeboat is located at, and nominally to deliver logistics to the space platform. One method for delivering a DLM to a space platform (but not limited to) the method is described in U.S. Pat. No. 6,669,148. Another method for delivering a DLM to a space platform was demonstrated by the Russian Pirs module, which serves as an airlock at the International Space Station. After the DLM and CRS are in orbit at a space platform, the upper-stage would be launched to a parking orbit by an expendable launch vehicle, and await the arrival of both the DLM and the CRS, either separately or together. The DLM must be brought from the space platform to dock with the upper-stage, either by the lifeboat (Case #2) or another separate spacecraft that is at the space platform that acts as a space tug (Case #3). If the lifeboat transfers the DLM and docks it to the upper-stage (Case #2), then the combined assembly is ready for translunar injection. If a separate spacecraft, acting as a space tug, transfers the DLM and docks it to upper-stage (Case #3), then the lifeboat maneuver (to bring the crew from the space platform to the assembled complex) comes next. In case #2, the attitude control of the upper-stage must be provided by the upper-stage as it awaits the arrival of the lifeboat+DLM.

In case #3, the attitude control of the DLM would be maintained first by the space-tug and then by the upper stage of an expendable launch vehicle, and the upper-stage+DLM would await the arrival of the lifeboat. In both cases #2 and #3, the upper-stage also would maintain and store a large supply of propellant and have the capability of engine restart. In both cases #2 and #3, once the lifeboat, DLM and upper stage are all docked together, in one spacecraft complex, the upper stage would ignite its engine(s) and provide trans-lunar injection for the entire CRS+DLM+upper-stage complex. Case #2 and #3 (in particular) have additional complexity over case #1, which is a disadvantage, however each has two advantages over case #1, specifically that A) The DLM is used for two missions, which is economically attractive an may lower the cost of a lunar trip even further, and B) It allows a given launch vehicle to launch an even larger upper-stage with more propellant to a parking orbit than otherwise possible if that same launch had to launch the upper-stage and DLM at the same time.

BRIEF DESCRIPTION OF THE DRAWINGS

FIG. 2 is a mission diagram for a lunar mission performed by the Docking Logistics Module, Lifeboat and upper stage of the present invention.

SPECIFIC EMBODIMENT OF THE INVENTION

Figure 1:
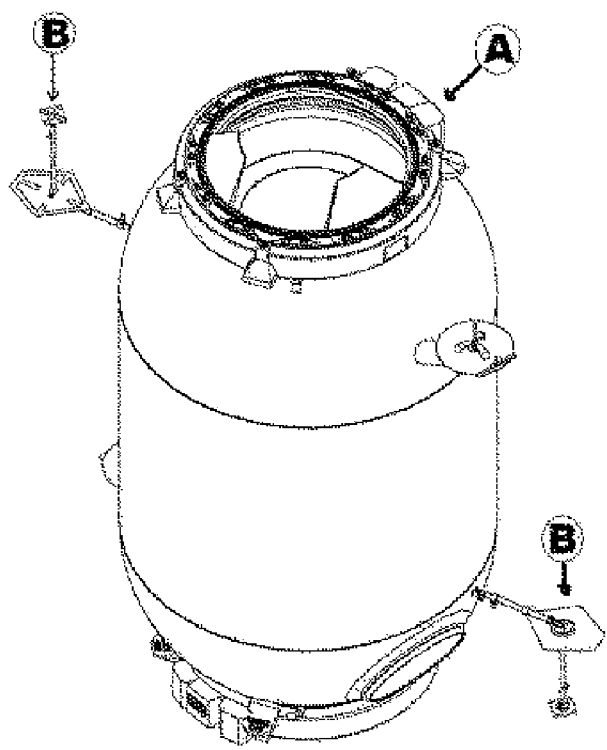
FIG. 1 shows an isometric drawing of a Docking/Logistics Module taught by the present invention.

There are two components required for the method described herein for a space station lifeboat to serve as a lunar spacecraft:

A lunar docking module containing supplies, docking systems, and equipment required for the lunar mission; and A launch vehicle upper stage that contains sufficient propellant to send the lunar docking module plus lifeboat to the lunar vicinity.

The stabilization might be accomplished in multiple ways, such as a launch vehicle with an upper-stage capable of three axis stabilization, or a gravity-gradient stabilization system for the lunar docking module and launch vehicle upper-stage. The lunar docking module can be transported a point in space via any space launch vehicle, single or multistage, expendable or reusable, or via a space transport vehicle (such as a space tug) from another space platform in a different orbit. The lunar docking module could contain pressurized sections for crew, could contain other closed volume for liquid or gas containment, and could contain open sections suitable to carry external cargo, and could have two docking ports, usually on opposite sides of the lunar docking module at the axial locations. The lunar docking module might contain its own power, communications, and rendezvous subsystems, or might draw on the space launch vehicle, space transport vehicle, and/or upper stage for these resources. The lunar docking module has no provision for its own propulsion or attitude control, and relies on the launch vehicle, space transport vehicle, or stricken spacecraft for these functions. Additionally, the lunar docking module may contain associated rendezvous sensors at both ends required by the lifeboat.

The method for using the space station lifeboat as a lunar spacecraft is as follows:

Step Zero: Prior to launch, the space station lifeboat is fitted with a heat shield capable of withstanding the extra thermal energy required for a return from the lunar vicinity. Such a heat shield has been successfully tested by the Soyuz spacecraft during the Zond lunar program, but this method is not limited to this type of heat shield.

Step One: Some time later, at the end of the nominal service life as a space station lifeboat, and at the appropriate time for a subsequent lunar mission, a launch vehicle orbits the lunar docking module. The launch vehicle should have sufficient capability that the final stage is orbited with sufficient propellant that it can subsequently send both the lunar docking module and lifeboat to the lunar vicinity. Such launch vehicles exist today, and include versions of Atlas, Delta and the Proton family of launchers.

Step Two: A crew leaves the space station, enters the lifeboat, and leaves the space station vicinity for a subsequent docking with the lunar docking module and upper stage. The crew size could be as small as one, or up to the total capacity of the lifeboat.

Step Three: The launch vehicle upper stage fires to send the lunar docking module and lifeboat to the desired translunar trajectory. Note that the destination could be the lunar vicinity or a location at a Sun-Earth or Earth-Moon libration point; these latter locations may require subsequent maneuvers by the upper stage or lifeboat to reach the necessary orbit.

Step Four: After departure from the vicinity of the Earth, science experiments or operations may be conducted. As an example, the lunar docking module and lifeboat may separate from the upper stage via a tether, and use the tether to generate the equivalent of partial gravitational forces using centrifugal forces. This partial gravity may be the equivalent of Mars gravity, lunar gravity, or some lesser force, depending on the length of the tether and the speed of the rotation of the system. Conversely, the lifeboat and docking module complex may orbit a libration point and dock with other assemblies already at that location.

Step Five: Safe return to Earth, either by free return from the lunar vicinity, or a maneuver conducted by the lifeboat engines, or the upper stage engines. Landing is conducted in the normal manner for the lifeboat.

What is claimed is:

1. A method of using a space station lifeboat, lunar docking logistics module and upper stage propulsion system as a deep space craft for operation beyond low Earth orbit comprising the steps of: fitting the space station lifeboat prior to launch with a heat shield capable of withstanding the extra thermal energy required for a safe return to the Earth's surface from beyond low Earth orbit, launching a docking module from the Earth on a launch vehicle having a final upper stage having sufficient propulsive capability to send both the docking module and lifeboat to an orbit or trajectory beyond low Earth orbit; transferring at least one person as crew from the space station to the lifeboat; docking the lifeboat with the docking module and upper propulsive stage to form the deep space craft; at the appropriate time as determined by orbital mechanics for a flight beyond low earth orbit; launching the deep space craft to an orbit or trajectory beyond low Earth orbit using the propulsive capability of the launch vehicle upper stage; returning the deep space craft to the vicinity of the Earth; separating the lifeboat from the docking module and upper propulsive stage; and landing the lifeboat on the Earth.

2. A method as in claim 1 where the deep space trajectory beyond low Earth orbit is a trans-lunar injection trajectory that permits a lunar partial orbit free return to the vicinity of the Earth from the vicinity of the moon.

3. A method as in claim 1 where the deep space trajectory beyond low Earth orbit is a trajectory to a Sun-Earth or Earth-Moon libration point or to lunar orbit and includes the step of using the propulsive capability of the upper stage or lifeboat to reach the desired deep space orbit and to return to the vicinity of the Earth.

4. A method as in claim 1 including the step of conducting scientific experiments after departure from the vicinity of the Earth.

5. A method as in claim 4 including the step of separating the docking module and the lifeboat from the upper stage by a connecting tether to form a deep space tethered space craft and using rotation of the said space craft around its center of mass to generate the equivalent of partial gravitational forces using centrifugal forces, wherein said partial gravity may be the equivalent of Mars gravity, lunar gravity, or some lesser force, depending on the length of the tether and the speed of the rotation of the system.

\* \* \* \* \*